(12) United States Patent
Becerra et al.

(10) Patent No.: US 9,538,610 B2
(45) Date of Patent: Jan. 3, 2017

(54) CIRCUITS FOR PHASE-CUT ANALOG DIMMING OF SOLID STATE LIGHT SOURCES

(71) Applicants: Chaim Becerra, Danvers, MA (US); Biju Antony, Lynnfield, MA (US); Ashwani Guleria, Beverly, MA (US)

(72) Inventors: Chaim Becerra, Danvers, MA (US); Biju Antony, Lynnfield, MA (US); Ashwani Guleria, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/681,823

(22) Filed: Apr. 8, 2015

(65) Prior Publication Data
US 2015/0296591 A1    Oct. 15, 2015

Related U.S. Application Data

(60) Provisional application No. 61/979,251, filed on Apr. 14, 2014, provisional application No. 62/078,184, filed on Nov. 11, 2014.

(51) Int. Cl.
*H05B 37/02* (2006.01)
*H05B 39/04* (2006.01)

(52) U.S. Cl.
CPC ........ *H05B 37/0209* (2013.01); *H05B 39/044* (2013.01); *Y02B 20/146* (2013.01)

(58) Field of Classification Search
USPC .................................... 315/291, 299; 361/52
See application file for complete search history.

(56) References Cited

U.S. PATENT DOCUMENTS

| 8,643,297 B2* | 2/2014 | Yang ................. H05B 33/0815 315/219 |
| 8,975,820 B2* | 3/2015 | Seidmann .......... H05B 33/0845 315/149 |
| 2005/0122055 A1 | 6/2005 | Ballenger et al. |
| 2006/0043907 A1 | 3/2006 | Peka |
| 2013/0154487 A1* | 6/2013 | Kuang ............... H05B 33/0851 315/171 |

FOREIGN PATENT DOCUMENTS

| EP | 2 575 412 A1 | 4/2013 |
| WO | 2006/120641 A2 | 11/2006 |
| WO | 2011/021120 A2 | 2/2011 |

OTHER PUBLICATIONS

Jesus Maicas, International Search Report and Written Opinion of the International Searching Authority for PCT/US15/25508, Oct. 26, 2015, pp. 1-12, European Patent Office, Rijswijk, The Netherlands.

* cited by examiner

*Primary Examiner* — Thuy Vinh Tran
(74) *Attorney, Agent, or Firm* — Shaun P. Montana

(57) ABSTRACT

Circuits to provide phase-cut analog dimming of solid state light sources are presented. Each circuit comprises an anchoring circuit to communicate with a dimming controller circuit, the anchoring circuit having a proportional direct current (DC) voltage input, a biasing voltage input, a connection to a ground reference, and an output in communication with a dimming controller circuit. The anchoring circuit provides a reference voltage to permit phase cut dimming to be operable at a plurality of line voltages.

14 Claims, 14 Drawing Sheets

CIRCUITS FOR PHASE-CUT ANALOG DIMMING OF SOLID STATE LIGHT SOURCES

CROSS-REFERENCE TO RELATED APPLICATIONS

This application claims priority to U.S. Provisional Application No. 61/979,251, entitled "CIRCUIT FOR PHASE-CUT ANALOG DIMMING OF SOLID STATE LIGHT SOURCES", filed on Apr. 14, 2014, and U.S. Provisional Application No. 62/078,184, entitled "PEAK DETECTOR TO ENABLE UNIVERSAL VOLTAGE PHASE CUT DIMMING", filed on Nov. 11, 2014, the entire contents of both of which are hereby incorporated by reference.

TECHNICAL FIELD

The present invention relates to lighting, and more specifically, to electronic drivers that power one or more solid state light sources.

BACKGROUND

Conventional wall dimmers work quite smoothly with traditional (e.g., incandescent) lamp technology, and results in light that looks very appealing. It is aesthetically pleasing and economical in its implementation. To be fully embraced by end users, this is the benchmark dimming of solid state light sources needs to hit and then surpass. Unfortunately, dimmed solid state light sources often do not fare so well. Substantial power savings alone do not overcome the desire of the end user who is looking to re-create the effect and response of their existing lighting infrastructure.

The two major types of phase-cut dimmers used today (so-called because they remove, or cut, selected portions from each AC half-cycle wave) are leading-edge dimmers (LEDIM) and trailing-edge dimmers (TEDIM).

Consider an environment such as restaurants. Restaurants are quintessential environments for dimmer use, with the business norm being that lighting is in some dimmed mode, usually within the bottom 20% of the full-light level, to create a traditional intimate dining experience. By varying dimming, restaurants create areas of high luminance contrast ratios by having a low level background light between tables with often a highlight lamp or central candle placed on the table to create pools of lighting. After closing, and during the day, the restaurant may also require 100% lighting levels for cleaning, next day preparations, and so on. Movie theaters are another example of an environment where lighting is required in both dimmed mode (during the showing of a movie) and high luminance (non-dimmed) mode (before and after the movie is shown).

SUMMARY

Conventional techniques for dimming solid state light sources usually involve complicated circuitry to work with a traditional phase-cut dimmer or simply bypass or require the removal of a traditional phase-cut dimmer. Thus, there is currently no solution in particular for phase-cut dimming at 277 VAC applied to an analog primary-side regulated fly-back topology. Some analog solid state light source power supplies having universal input voltage capability (120 VAC and 277 VAC) may need phase-cut dimming (PCD) at 277 VAC, especially in retrofit applications. A primary-side regulated analog fly-back converter, in which the multiplier pin of the controller has to be conditioned to make the converter respond properly to either 120V or 277V, can operate with universal input voltage, but PCD is only suitable at 120V. Embodiments described herein solve the above mentioned problem, by introducing a circuit that enables the analog converter to be properly dimmed at 277V as well as 120V.

In an embodiment, there is provided a circuit. The circuit includes an anchoring circuit in communication with a dimming controller circuit, the anchoring circuit including a proportional direct current (DC) voltage input, a biasing voltage input, a connection to a ground reference, and an output in communication with the dimming controller circuit; wherein the anchoring circuit provides a reference voltage to permit phase cut dimming to be operable at a plurality of line voltages.

In a related embodiment, the anchoring circuit may include a first resistor including a first lead coupled to a positive proportional DC voltage and including a second lead; a second resistor including a first lead coupled to a biasing voltage and including a second lead; a third resistor including a first lead coupled to the biasing voltage and including a second lead; a fourth resistor including a first lead coupled to the second lead of the second resistor and including a second lead; a fifth resistor including a first lead coupled to a second lead of the third resistor and including a second lead; a first transistor including a first lead coupled to the second lead of the second resistor, a second lead coupled to the second lead of the first resistor, and a third lead coupled to the ground reference; a second transistor including a first lead coupled to the second lead of the fourth resistor, a second lead coupled to the second lead of the third resistor, and a third lead coupled to the ground reference; and a third transistor including a first lead coupled to the second lead of the fifth resistor, a second lead including an output of the anchoring circuit, and a third lead coupled to the ground reference.

In a further related embodiment, the first transistor may include a silicon controlled rectifier (SCR) and the first lead of the SCR may include an anode, the second lead may include a gate, and the third lead may include a cathode. In another further related embodiment, the second transistor may include an NPN transistor and the first lead of the NPN transistor may include a base of the NPN transistor, the second lead may include an emitter of the NPN transistor, and the third lead may include a collector of the NPN transistor. In still another further related embodiment, the third transistor may include a MOSFET and the first lead of the MOSFET may include a gate of the MOSFET, the second lead may include a drain of the MOSFET, and the third lead may include a source of the MOSFET.

In yet another further related embodiment, for a first input voltage the third transistor may be open, the second transistor may be closed, and the first transistor may be open. In still yet another further related embodiment, for a second input voltage the third transistor may be closed, the second transistor may be open, and the first transistor may be closed.

In another related embodiment, the anchoring circuit may include: a first resistor comprising a first lead coupled to a line voltage and comprising a second lead; a second resistor comprising a first lead coupled to a second lead of the first resistor and comprising a second lead coupled to the ground reference; a diode comprising a first lead comprising an anode coupled to the second lead of the first resistor and comprising a second lead comprising a cathode; a third resistor comprising a first lead coupled to the second lead of the diode and comprising a second lead; a fourth resistor comprising a first lead coupled to the second lead of the third resistor and comprising a second lead coupled to the ground reference; a first capacitor comprising a first lead coupled to the second lead of the diode, and comprising a second lead coupled to the ground reference; a first transistor comprising a first lead coupled to the second lead of the fourth resistor, a second lead comprising an output of the anchoring circuit, and a third lead coupled to the ground reference; and a second capacitor comprising a first lead coupled to the second lead of the first transistor, and comprising a second lead capable of being coupled to the dimming controller circuit.

In a further related embodiment, the first transistor may include a MOSFET and wherein the first lead of the MOSFET may include a gate of the MOSFET, the second lead may include a drain of the MOSFET, and the third lead may include a source of the MOSFET.

In another embodiment, there is provided a phase cut dimming circuit. The phase cut dimming circuit includes: a dimming controller circuit, the dimming controller circuit comprising an input receiving a line voltage, a connection to a ground, and an output; an anchoring circuit in communication with the dimming controller circuit, the anchoring circuit comprising an input, a connection to a ground, and an output in communication with the dimming controller circuit; wherein the anchoring circuit provides a reference voltage to permit phase cut dimming to be operable at a plurality of line voltages.

In a related embodiment, the dimming controller circuit may include a controller comprising an input coupled to a center point of a voltage divider circuit, the controller providing an output to couple to a primary side regulated analog flyback converter; and a voltage divider circuit coupled between the line voltage and the ground, wherein the voltage divider circuit may include: a first resistor comprising a first lead coupled to the input of the controller and a second lead coupled to the ground; a second resistor comprising a first lead coupled to the input of the controller and a second lead coupled to the line voltage, and wherein the first lead of the second resistor and the first lead of the first resistor comprise the center point of the voltage divider circuit; and a third resistor comprising a first lead coupled to the center point of the voltage divider circuit and a second lead to couple to an input of the anchoring circuit.

In another related embodiment, the anchoring circuit may include: a first resistor comprising a first lead coupled to a positive proportional DC voltage and comprising a second lead; a second resistor comprising a first lead coupled to a biasing voltage and comprising a second lead; a third resistor comprising a first lead coupled to the biasing voltage and comprising a second lead; a fourth resistor comprising a first lead coupled to the second lead of the second resistor and comprising a second lead; a fifth resistor comprising a first lead coupled to a second lead of the third resistor and comprising a second lead; a first transistor comprising a first lead coupled to the second lead of the second resistor, a second lead coupled to the second lead of the first resistor, and a third lead coupled to the ground reference; a second transistor comprising a first lead coupled to the second lead of the fourth resistor, a second lead coupled to the second lead of the third resistor, and a third lead coupled to the ground reference; and a third transistor comprising a first lead coupled to the second lead of the fifth resistor, a second lead comprising an output of the anchoring circuit, and a third lead coupled to the ground reference. In a further related embodiment, the first transistor may include a silicon controlled rectifier (SCR) and the first lead of the SCR may include an anode, the second lead may include a gate, and the third lead may include a cathode.

In another further related embodiment, the second transistor may include an NPN transistor and the first lead of the NPN transistor may include a base of the NPN transistor, the second lead may include an emitter of the NPN transistor, and the third lead may include a collector of the NPN transistor. In yet another further related embodiment, the third transistor may include a MOSFET and wherein the first lead of the MOSFET may include a gate of the MOSFET, the second lead may include a drain of the MOSFET, and the third lead may include a source of the MOSFET.

In still another further related embodiment, for a first input voltage, the third transistor may be open, the second transistor may be closed, and the first transistor may be open. In yet still another further related embodiment, for a second input voltage, the third transistor may be closed, the second transistor may be open, and the first transistor may be closed.

In still yet another further related embodiment, the anchoring circuit may include: a first resistor comprising a first lead coupled to a line voltage and comprising a second lead; a second resistor comprising a first lead coupled to a second lead of the first resistor and comprising a second lead coupled to the ground reference; a diode comprising a first lead comprising an anode coupled to the second lead of the first resistor and comprising a second lead comprising a cathode; a third resistor comprising a first lead coupled to the second lead of the diode and comprising a second lead; a fourth resistor comprising a first lead coupled to the second lead of the third resistor and comprising a second lead coupled to the ground reference; a first capacitor comprising a first lead coupled to the second lead of the diode, and comprising a second lead coupled to the ground reference; a first transistor comprising a first lead coupled to the second lead of the fourth resistor, a second lead comprising an output of the anchoring circuit, and a third lead coupled to the ground reference; and a second capacitor comprising a first lead coupled to the second lead of the first transistor, and comprising a second lead capable of being coupled to the dimming controller circuit.

In a further related embodiment, the first transistor may include a MOSFET and wherein the first lead of the MOSFET may include a gate of the MOSFET, the second lead may include a drain of the MOSFET, and the third lead may include a source of the MOSFET.

Note that each of the different features, techniques, configurations, etc. discussed herein can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and the corresponding figures as further discussed below.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1:
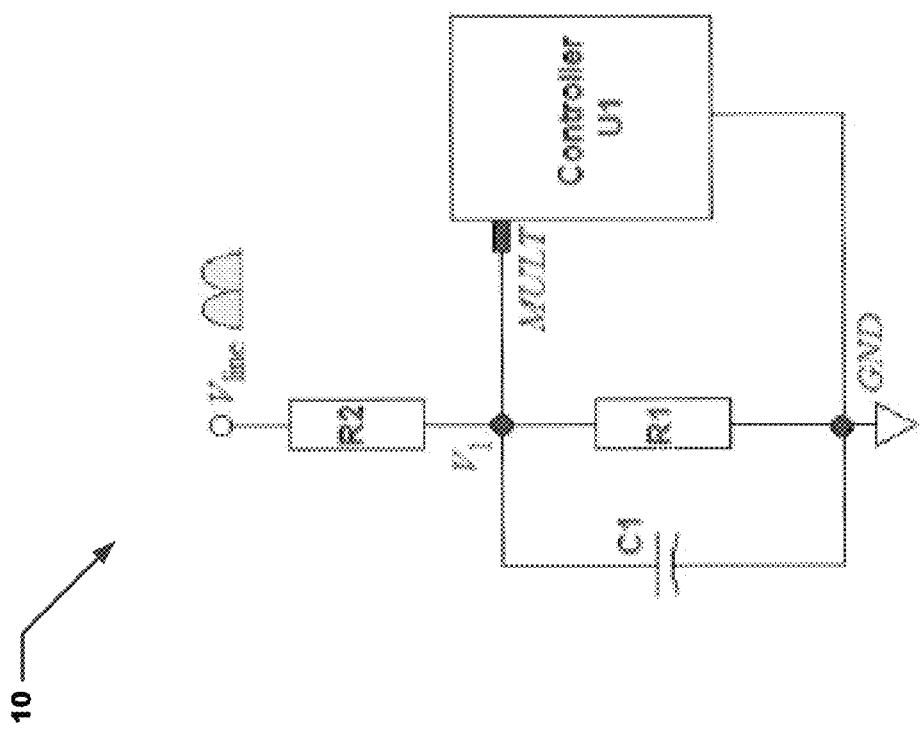
FIG. 1 depicts a schematic of a conventional controller and support circuitry for handling a single line voltage.

Embodiments shown and described throughout allow analog primary-side regulated fly-back converters to be upgraded to enable phase cut dimming at, for example, 277 VAC, by using a low cost analog anchoring circuit. The circuit enables a linear range of clean dimming for solid state light sources. Referring to FIG. 1, a dedicated voltage (either 120 or 277 Volts Alternating Current (VAC)) configuration 10 is shown in which a voltage $V_1$ at a multiplier pin MULT of a controller U1 is simply taken from a voltage-divider of a line voltage $V_{line}$, given by $V_1=V_{line}R1/(R1+R2)$. Using this configuration, phase-cut dimming is possible, but not for universal voltage operation. That is, a change in the line voltage $V_{line}$ results in corresponding changes required in the first resistor R1, which has a first lead and a second lead, and the second resistor R2, which also has a first lead and a second lead. The first lead of the second resistor R2 is connected to the line voltage $V_{line}$, and the second lead of the second resistor R2 is connected to the first lead of the first resistor R1. The second lead of the first resistor R1 is connected to ground.

Figure 2:
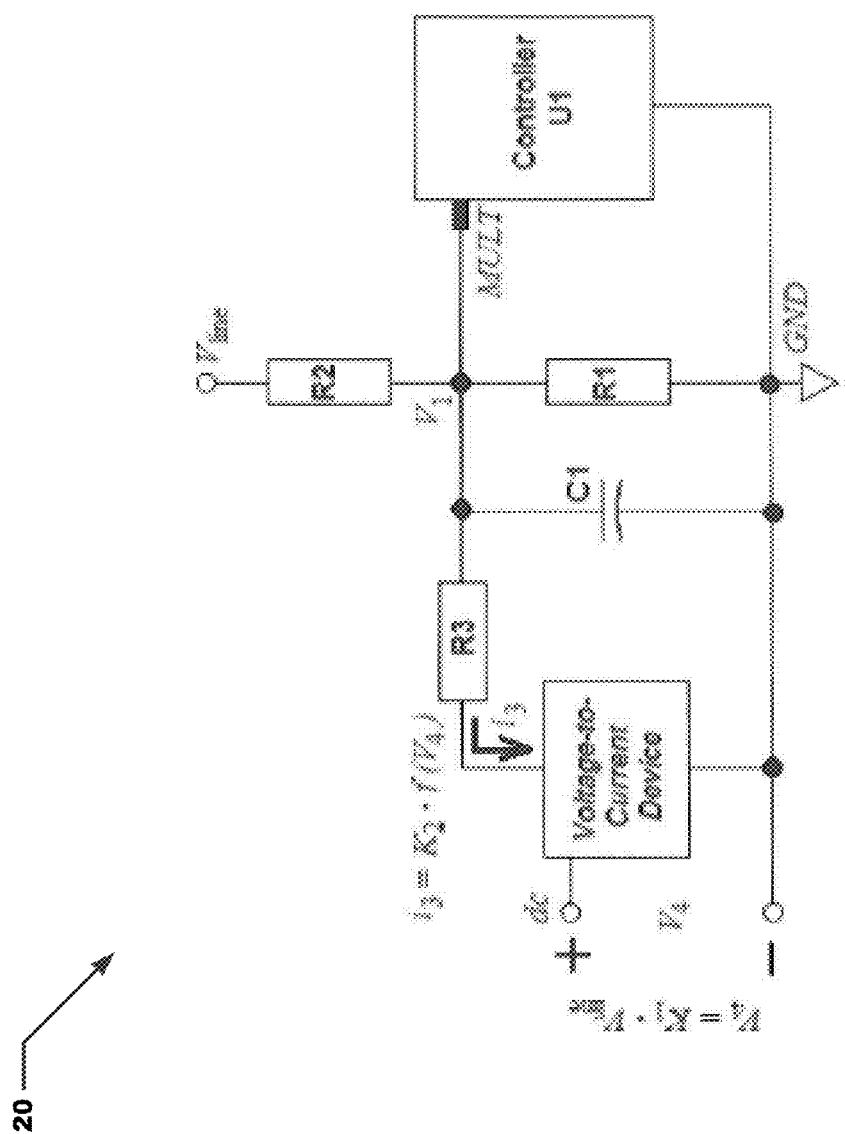
FIG. 2 depicts a schematic of a conventional controller and support circuitry for handling multiple line voltages.
Figure 3:
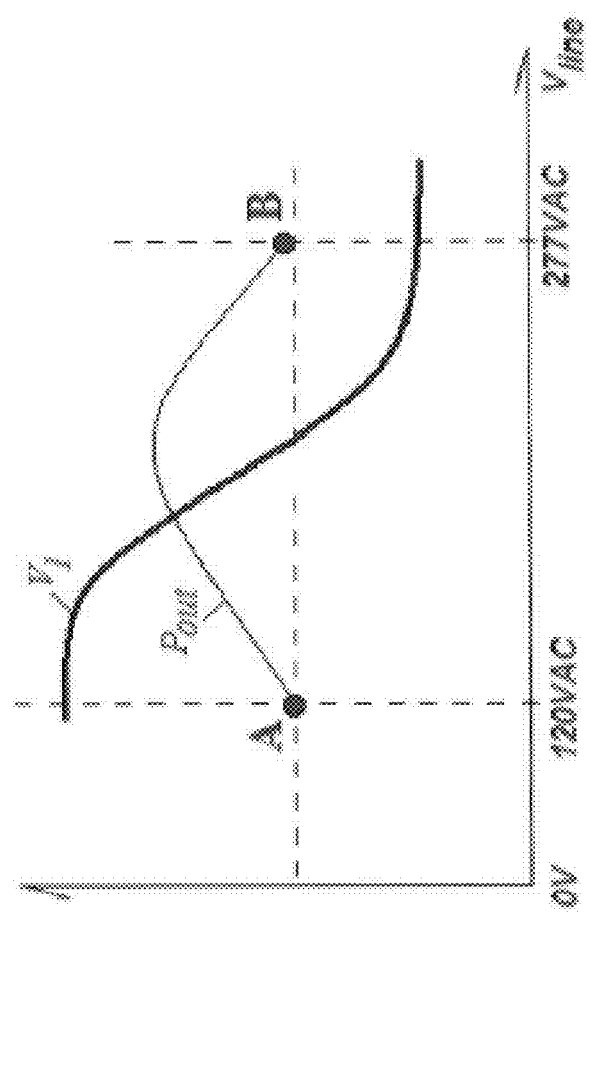
FIG. 3 depicts a graph of the voltage and power provided by the circuit of FIG. 2.

When universal input voltage operation is needed, a modified circuit 20 including extra circuitry than shown in FIG. 1 is required around the multiplier pin MULT of the controller U1, like the one shown in FIG. 2, in order to make the circuit 20 deliver the same level of power at both 120 VAC and 277 VAC. Here, the line voltage $V_{line}$ appears in the form of a proportional direct current (DC) voltage 174 at an input of a voltage-to-current device, which is actually an NPN transistor, with an input current $i_3$ being a collector current. The collector of the NPN transistor (i.e., the voltage-to-current device) is connected to a third resistor R3, which is connected to the voltage divider formed by the first resistor R1 and the second resistor R2. More specifically, the third resistor R3 has a first lead, connected to the collector of the NPN transistor, and a second lead, connected to the voltage divider (i.e., to the second lead of the second resistor R2 and the first lead of the first resistor R1). A capacitor C1, having a first lead and a second lead, is in parallel across the first resistor R1, such that the first lead of the capacitor C1 is connected to the first lead of the first resistor R1, and the second lead of the capacitor C1 is connected to the second lead of the first resistor R1. At 120 VAC, with no dimming, the proportional DC voltage $V_4$ is relatively low and drives the NPN transistor into cut-off, so the voltage $V_1$ at the multiplier pin MULT follows the voltage-divider effect given by the selected first resistor R1 and the second resistor R2. At 277 VAC, with no dimming, the proportional DC voltage $V_4$ goes high, the NPN transistor enters its active region, and the collector current $i_3$ increases, pulling the voltage $V_1$ down in such a way that output power remains the same as at 120 VAC. This is illustrated in a graph 30 shown in FIG. 3. All component values are tuned to give the same output power during no-dimming operation at both points A and B in the graph 30.

Figure 4:
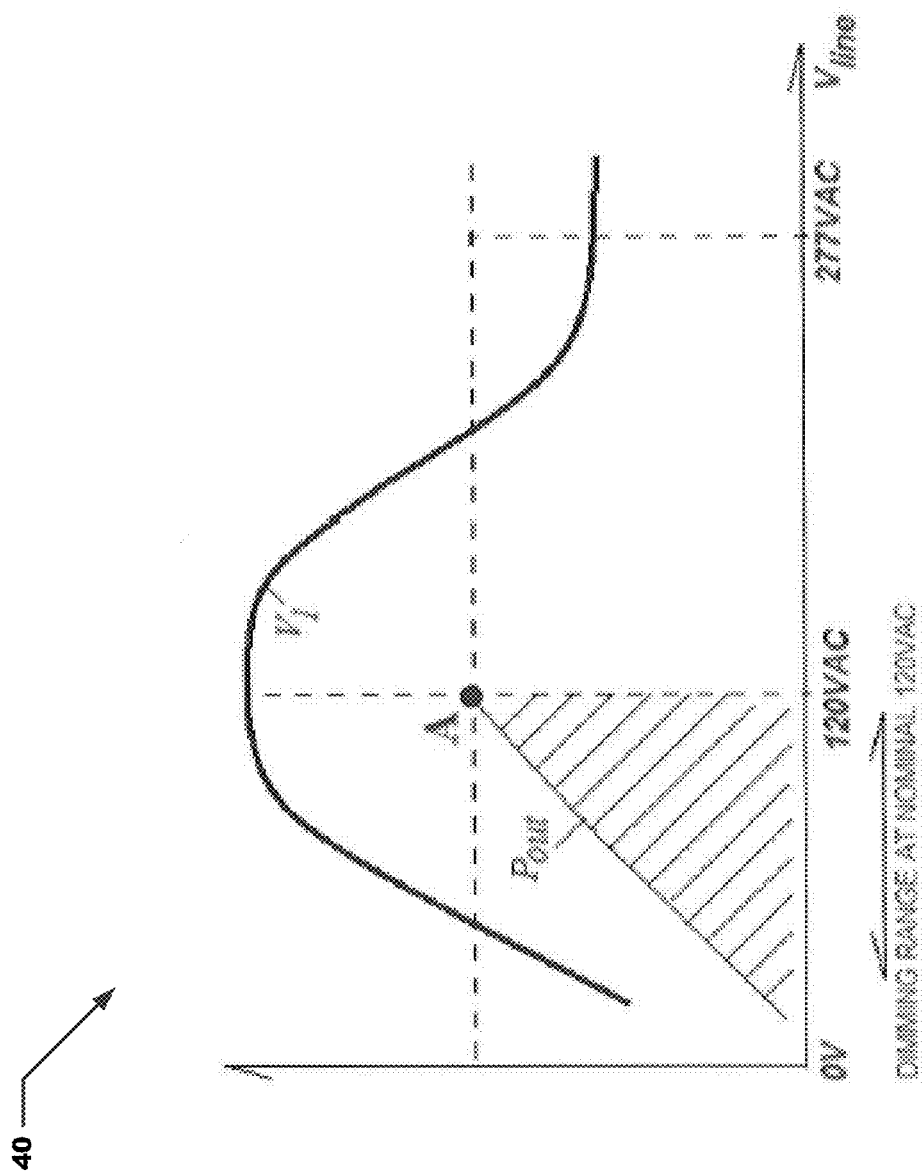
FIG. 4 depicts a graph showing a dimming range for a first line voltage.
Figure 5:
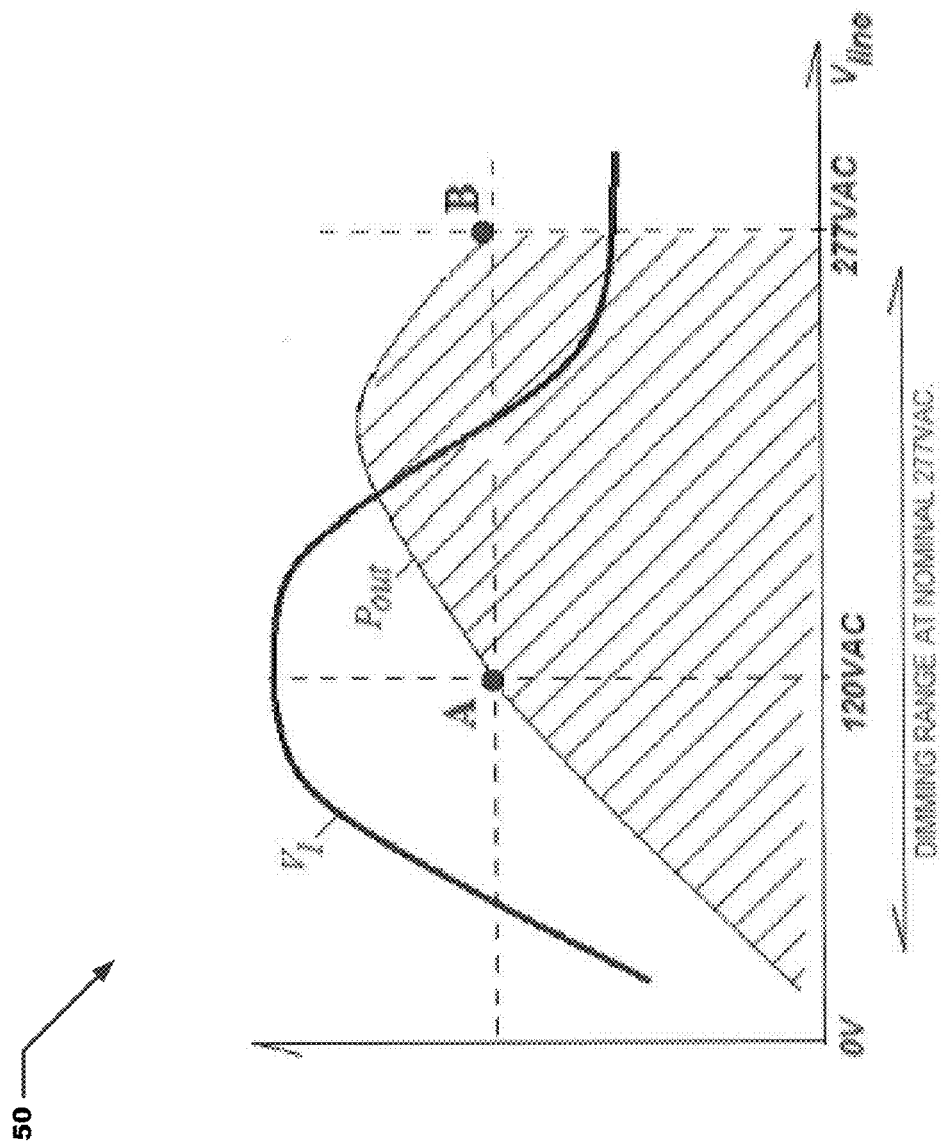
FIG. 5 depicts a graph showing a dimming range for a second line voltage.

When phase-cut dimming is performed at 120 VAC, the proportional DC voltage 174 decreases when the dimmer is slid down. This does not affect the situation with the voltage 171, as the NPN transistor remains in cut-off, so the third resistor R3 between the voltage divider and the NPN transistor (shown in FIG. 2) is not in the circuit. The output power goes with the dimmer action, from 0V to point A, and the voltage $V_1$ remains at the same level in at point A as shown in a graph 40 of FIG. 4. However, if the same circuit is used for phase-cut dimming at 277 VAC, no linearity shows up between the output light and the dimmer position, from 0V to point B, as illustrated in a graph 50 of FIG. 5. Therefore, the circuit of FIG. 2 is not recommended for 277 VAC phase-cut dimming purposes, as it produces non-linear results.

Figure 6:
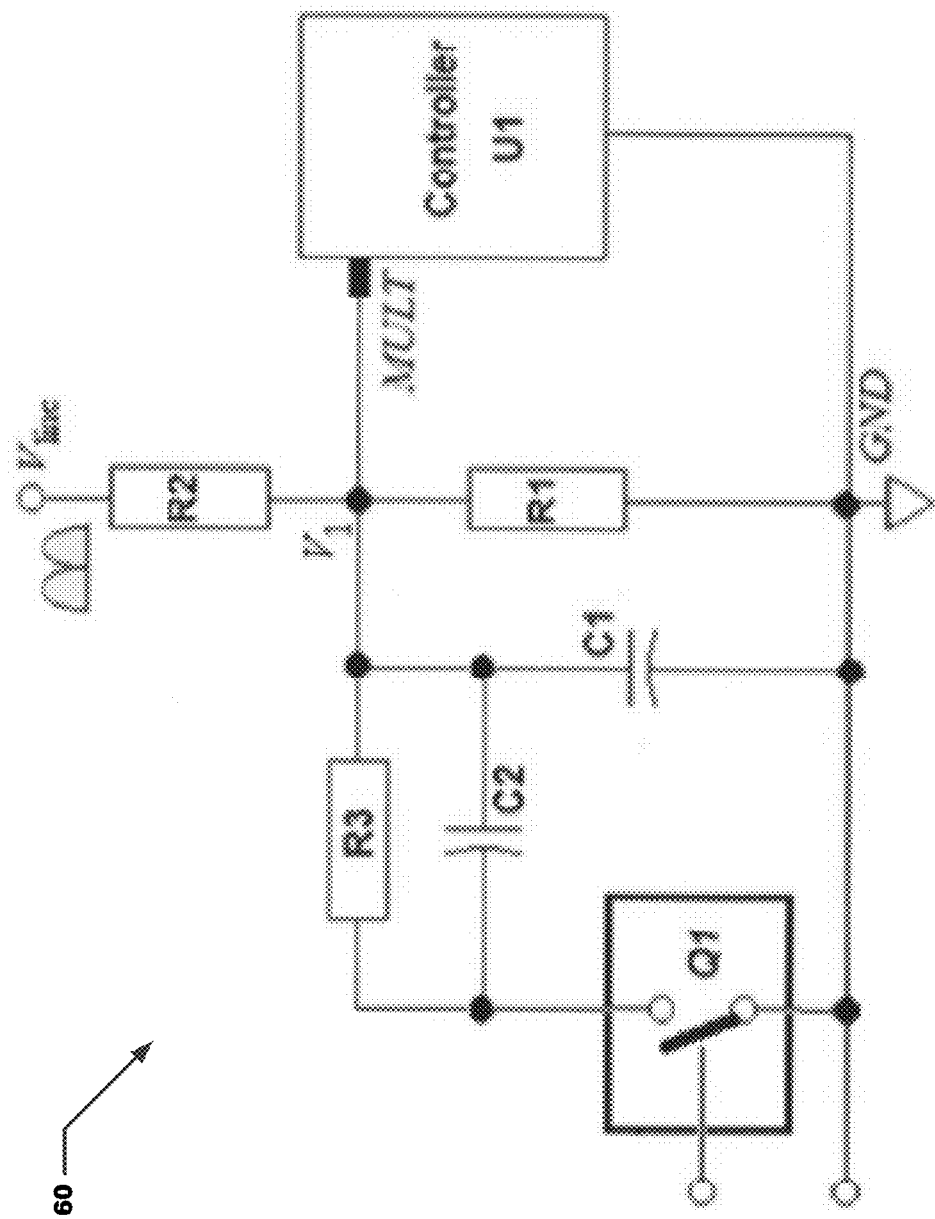
FIG. 6 depicts a schematic of another conventional controller and support circuitry for handling multiple line voltages.
Figure 7:
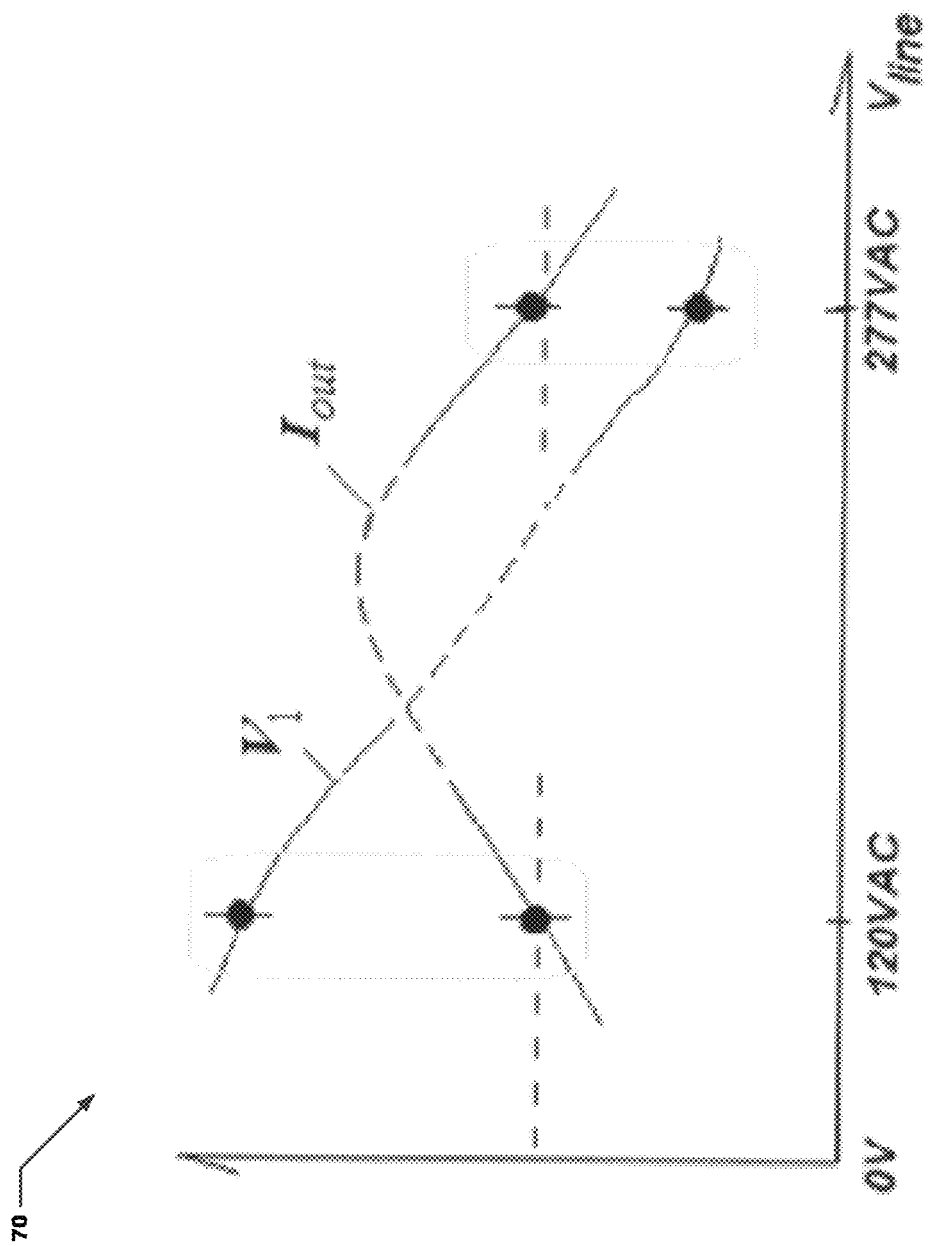
FIG. 7 depicts a graph of the voltage and current provided by the circuit of FIG. 6.

Referring now to FIG. 6, a circuit 60 is shown that allows a proper response of the converter for universal input voltage. When operating at a first voltage, for example 120 VAC, a switch Q1 (which in some embodiments is a MOSFET) is maintained open, in which case the voltage $V_1$ at the multiplier pin MULT of the controller U1 is taken from a straightforward voltage divider of the rectified line voltage $V_{line}$, given by $V_1=V_{line}*R1/(R1+R2)$. A capacitor C1 is present to reduce noise at the multiplier pin MULT. When operating at a second voltage, for example 277 VAC, the switch Q1 should be maintained closed. This places the first resistor R1 in parallel with the third resistor R3, which furnishes a lower voltage $V_1$, making the circuit deliver just about the same output current as at the first voltage (e.g., 120 VAC), as shown in FIG. 7, which is a graph 70 of the voltage $V_1$ at the multiplier pin MULT and an output current $I_{out}$ at 120 VAC and 277 VAC operation. A second capacitor C2, in parallel with the capacitor C1, reinforces the bypass action at the multiplier pin MULT.

Figure 9:
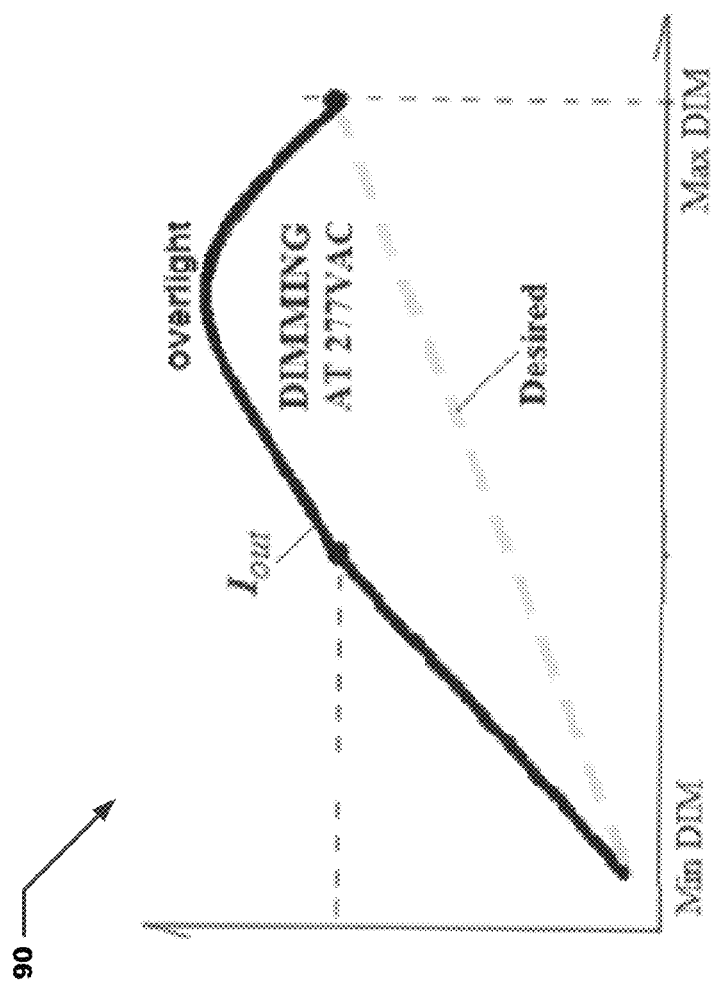
FIG. 9 depicts a graph showing a dimming range for a second line voltage for the circuit of FIG. 6.
Figure 8:
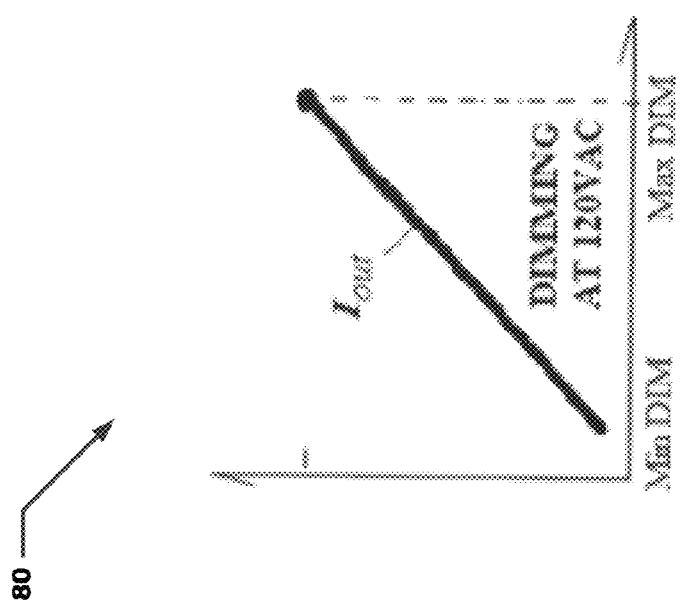
FIG. 8 depicts a graph showing a dimming range for a first line voltage for the circuit of FIG. 6.

Looking again at the graph 70 of FIG. 7 when dimming is applied, the behavior of the output current $I_{out}$ versus the dimmer position is not the same for dimming at the first voltage (i.e., 120 VAC) as for dimming at the second voltage (i.e., 277 VAC). When a dimmer is connected at the first voltage (i.e., 120 VAC), the output current $I_{out}$ will substantially follow the position of the dimmer. But when dimming occurs at the second voltage (i.e., 277 VAC), there is a challenge of the output current $I_{out}$ going high, which occurs somewhere in between 120 VAC and 277 VAC, possibly around the midway point, resulting in an "overlight" situation. Graphs 80 and 90 of FIGS. 8 and 9, respectively, illustrate the situation comparing the output current $I_{out}$ for 120 VAC dimming (FIG. 8) with 277 VAC dimming (FIG. 9). FIG. 9 also shows what the desired behavior of the output current $I_{out}$ at 277 VAC dimming should be. Embodiments make the desired behavior happen when phase-cut dimming occurs at the second voltage (e.g., 277 VAC), without going into the unwanted "overlight" situation.

Figure 10:
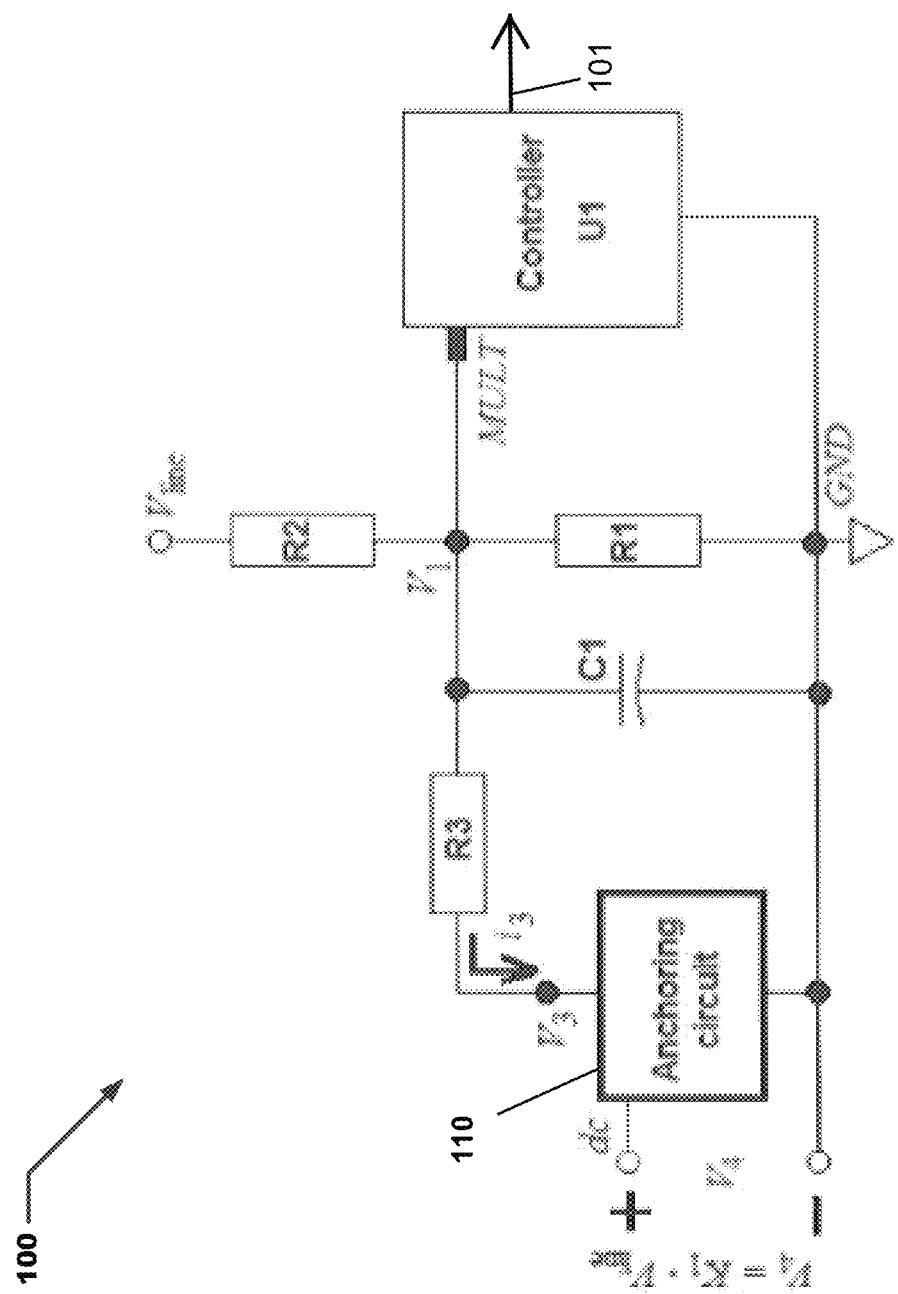
FIG. 10 depicts a schematic of a first circuit to provide phase-cut analog dimming of solid state light sources according to embodiments disclosed herein.
Figure 11:
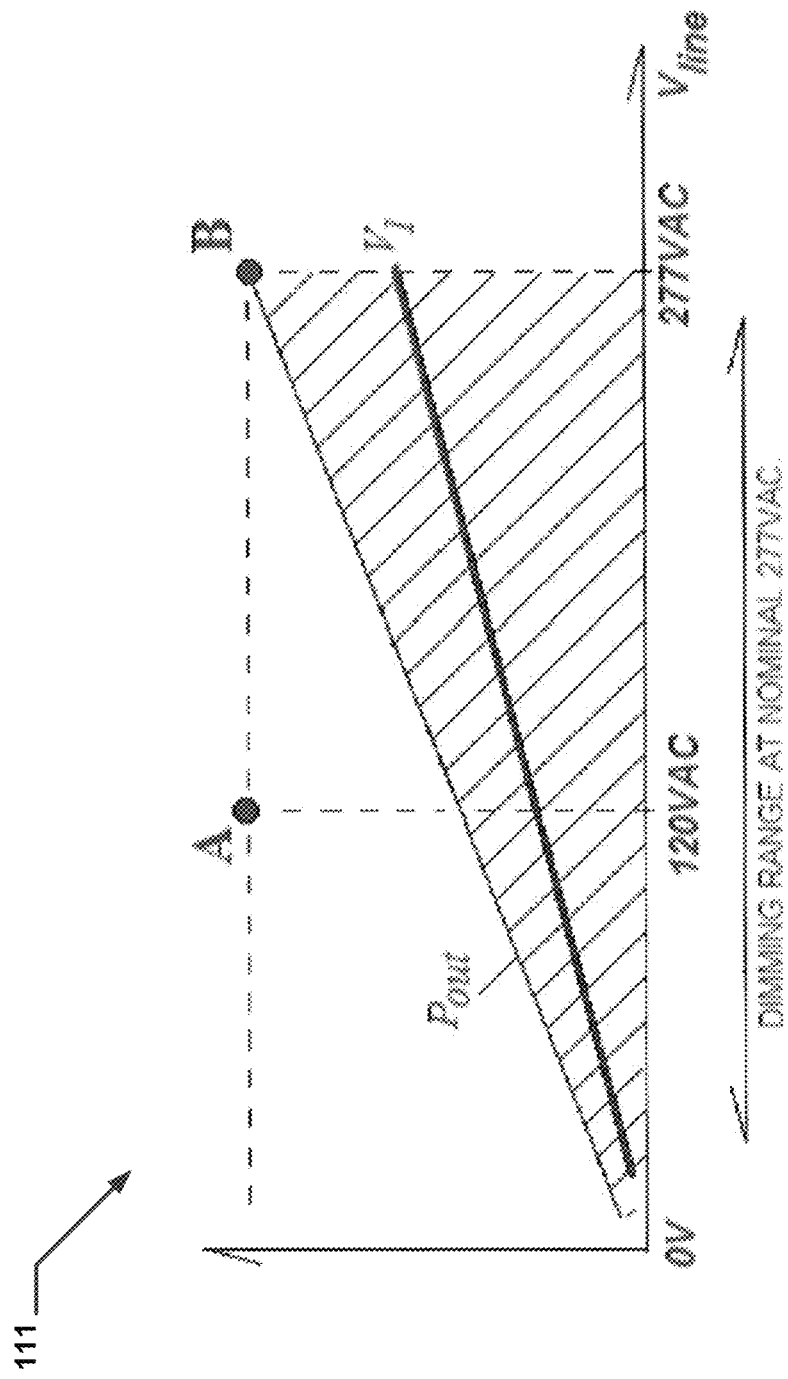
FIG. 11 depicts a graph showing a dimming range for multiple line voltages for the circuit of FIG. 10, according to embodiments disclosed herein.

The presently disclosed circuits for phase-cut analog dimming of solid state light sources allow the primary-side regulated power supply to be compatible with leading edge and trailing edge dimmers for both 120 VAC and 277 VAC. FIG. 10 shows a circuit 100, which is substantially similar to the circuit 20 of FIG. 2, except that the NPN transistor is replaced with an anchoring circuit 110, such that the first lead of the third resistor R3 is connected to the anchoring circuit 110, and an output 101 from the controller U1 is shown, which, in some embodiments, is coupled to a primary side regulated analog flyback converter (not show). At 120 VAC, the anchoring circuit 110 makes the third resistor R3 to be out of the circuit (such that the current $i_3$=0, or a voltage between the anchoring circuit 110 and the third resistor R3 $V_3$=the voltage $V_1$, which is at a high level), and stays like that during the whole sliding range of the phase-cut dimmer. At 277 VAC, the anchoring circuit makes the third resistor R3 to be in the circuit (that is, the voltage $V_3 \approx 0$), so the voltage V1 is at a low level, and stays like that for the whole sliding range of the 277V dimmer. This allows the phase cut dimming at 277 VAC to be done in such a way that the output current, and thus the light output by the solid state light source(s) driven by that output current, goes with the dimmer action, as illustrated in a graph 111 shown in FIG. 11.

Figure 12:
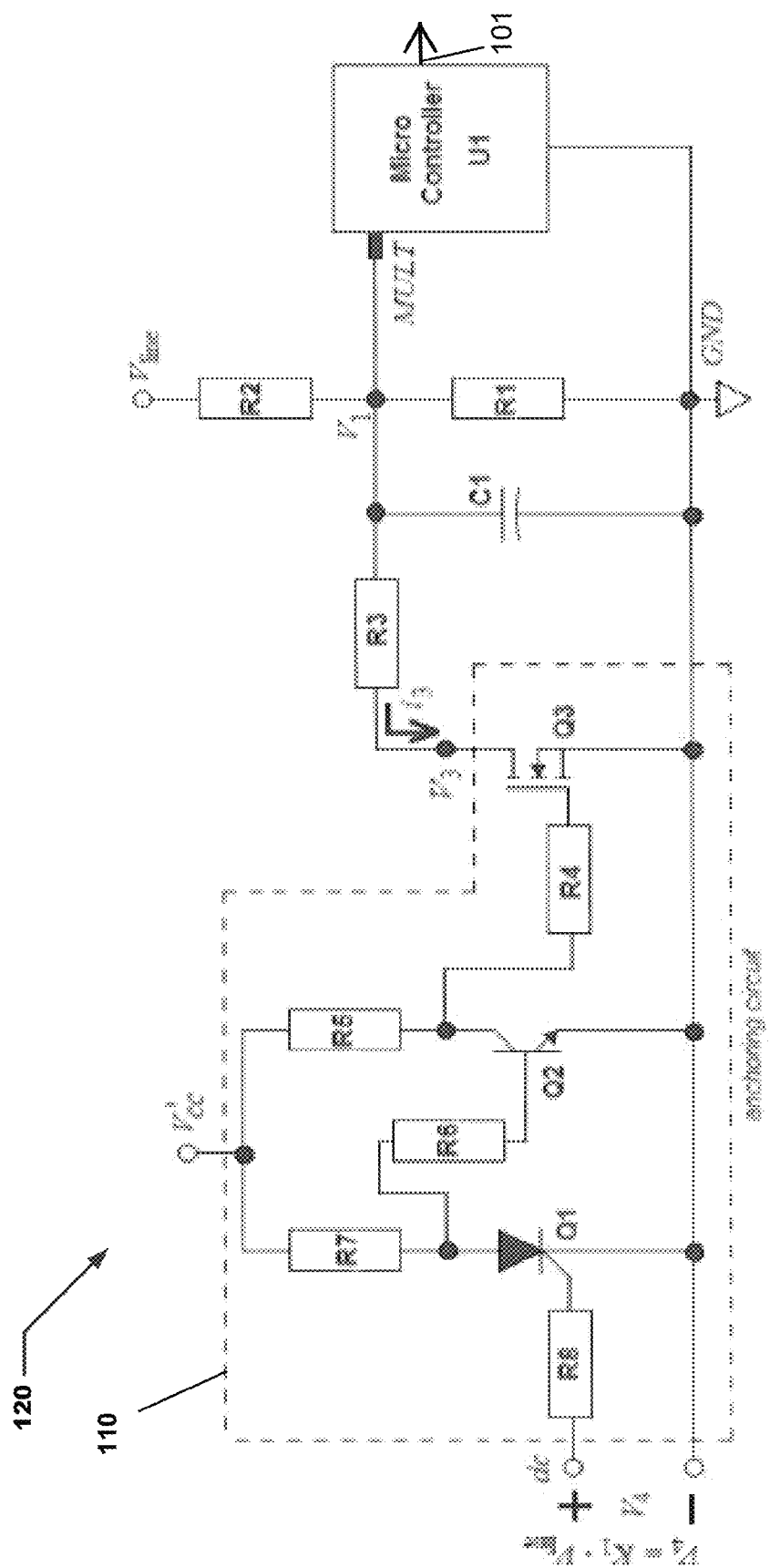
FIG. 12 depicts a schematic of the first circuit to provide phase-cut analog dimming of solid state light sources including an anchoring circuit according to embodiments disclosed herein.

A schematic of a circuit 120 including the anchoring circuit 110 in detail and the rest of the circuit 100 of FIG. 10 is shown in FIG. 12. A MOSFET Q3 having three leads, that is, a gate, a source, and a drain, is connected between the third resistor R3 and ground. More specifically, the source is connected to the first lead of the third resistor R3, the drain is connected to ground, and the gate is connected to a fourth resistor R4. The fourth resistor R4 has a first lead, which is connected to a fifth resistor R5, and a second lead, which is connected to the gate of the MOSFET Q3. The fifth resistor R5 has a first lead and a second lead, where the second lead is connected to the first lead of the fourth resistor R4 and to an NPN transistor Q2 having three leads, that is, a base, a collector, and an emitter. More specifically, the second lead of the fifth resistor R5 and the first lead of the fourth resistor R4 are connected to the collector of the NPN transistor Q2. The emitter of the NPN transistor Q2 is connected to ground. The base of the NPN transistor Q2 is connected to a sixth resistor R6, which has a first lead and a second lead. The second lead of the sixth resistor R6 is connected to the base of the NPN transistor Q2, while the first lead of the sixth resistor R6 is connected to a seventh resistor R7. The seventh resistor R7 has a first lead, which is connected to the first lead of the sixth resistor R6, and a second lead, which is connected to the first lead of the fifth resistor R5. The sixth resistor R6 and the seventh resistor R7 are each connected to a silicon controller rectifier Q1, which has three leads, that is, an anode, a gate, and a cathode. Thus, the first lead of the sixth resistor R6 and the first lead of the seventh resistor R7 are both connected to the anode of the silicon controller rectifier Q1. The cathode of the silicon controller rectifier Q1 is connected to ground, and the gate of the silicon controller rectifier Q1 is connected to an eighth resistor R8. The eighth resistor R8 has a first lead, connected to the proportional DC voltage $V_4$, and a second lead, connected to the gate of the silicon controller rectifier Q1.

In order to differentiate between operating and dimming at 120 VAC in comparison with operating and dimming at 277 VAC, the following happens. The MOSFET Q3 is open when the circuit 120 normally operates at 120 VAC, and along the whole sliding range of the phase-cut dimmer at 120 VAC. During all these events, the NPN transistor Q2 remains closed, and the silicon controller rectifier Q1 remains open. The MOSFET Q3 is closed when the circuit 120 is powered with 277 VAC, and along the whole sliding range of the phase-cut dimmer at 277 VAC. During all these events, the NPN transistor Q2 remains open, and the silicon controller rectifier Q1 remains closed.

This is summarized in Table 1. To make these conditions happen, the action of the silicon controller rectifier (SCR) Q1 has to be set by choosing the values of the seventh resistor R7 and the eighth resistor R8 in such a way that the silicon controller rectifier Q1 triggers at 277 VAC, but not at 120 VAC. In addition, a biasing voltage $V'_{cc}$, applied to the first lead of the fifth resistor R5 and the second lead of the seventh resistor R7, is incorporated to maintain the status of the silicon controller rectifier Q1, the NPN transistor Q2, and the MOSFET Q3, as required. To avoid loading problems at turn-on, the biasing voltage $V'_{cc}$ is separated from a regular voltage $V_{cc}$ assigned to a microcontroller U1, being both originated from the same auxiliary winding in a transformer (not shown).

TABLE 1

| State of switches during full range of dimming | | | | |
|---|---|---|---|---|
| $V_{line}$ | $Q_1$ | $Q_2$ | $Q_3$ | PCD |
| 120 VAC | open | close | open | Whole range |
| 277 VAC | close | open | close | Whole range |

Figure 13:
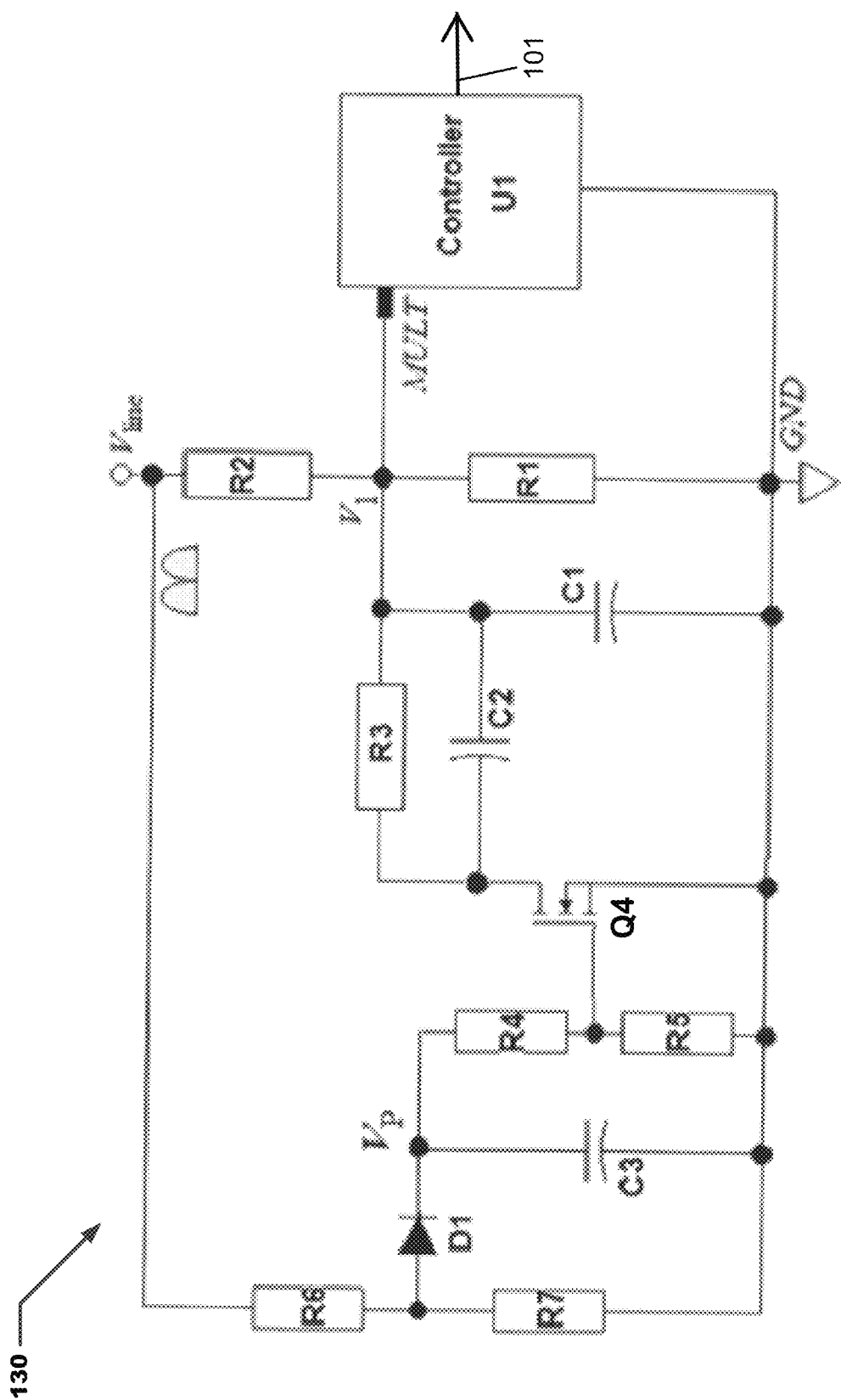
FIG. 13 depicts a schematic of a second circuit to provide phase-cut analog dimming of solid state light sources according to embodiments disclosed herein.

FIG. 13 shows a circuit 130 to allow a proper response to phase-cut dimming for universal input voltage. The circuit 130 includes the controller U1, with the multiplier pin MULT, connected to a voltage divider formed by the first resistor R1 and the second resistor R2, with the voltage $V_1$ and the line voltage $V_{line}$, and the third resistor R3 and the capacitor C1 all connected as described above. The circuit 130 also includes a second capacitor C2 having a first lead and a second lead, with the first lead connected to the first lead of the third resistor R3 and the second lead connected to the second lead of the third resistor R3, such that the second capacitor C2 is in parallel with the third resistor R3. The circuit 130 also includes a MOSFET Q4, having three leads, that is, a gate, a source, and a drain. The source is connected to the first lead of the third resistor R3 and the first lead of the second capacitor C2. The drain is connected to ground, and the gate is connected to the fourth resistor R4 and the fifth resistor R5. The fourth resistor R4 and the fifth resistor R5 each have a first lead and a second lead, where the second lead of the fourth resistor R4 is connected to the first lead of the fifth resistor R5, and both are connected to the gate of the MOSFET Q4. The second lead of the fifth resistor R5 is connected to ground. The first lead of the fourth resistor R4 is connected to a first lead of a third capacitor C3, which also has a second lead connected to ground. Thus, the third capacitor C3 is in parallel with the series connection of the fourth resistor R4 and the fifth resistor R5. The first lead of the fourth resistor R4 is also connected to a diode D1, which has two leads, that is, an anode and a cathode. The cathode of the diode D1 is connected to the first lead of the fourth resistor R4 and the first lead of the third capacitor C3. The anode of the diode D1 is connected to the sixth resistor R6, which has a first lead and a second lead, and to the seventh resistor R7, which has a first lead and a second lead. The first lead of the seventh resistor R7 is connected to the anode of the diode D1, and the second lead of the seventh resistor R7 is connected to ground. The first lead of the sixth resistor R6 is connected to the anode of the diode D1 and the second lead of the sixth resistor R6 is connected to the line voltage $V_{line}$.

When operating at a first voltage, for example 120 VAC, the MOSFET Q4 is maintained open, in which case the voltage $V_1$ at the multiplier pin MULT of the controller U1 is taken from a straightforward voltage divider of the rectified line voltage, given by $V_1=V_{line}*R1/(R1+R2)$. The capacitor C1 is present to reduce noise at the multiplier pin MULT. When operating at a second voltage, for example 277 VAC, the MOSFET Q4 is maintained closed, placing the first resistor R1 in parallel with the third resistor R3, which results in a lower voltage $V_1$, making the circuit 130 deliver just about the same output current as when operating at the first voltage (e.g., 120 VAC). The second capacitor C2 is also now in parallel with the capacitor C1, which reinforces the bypass action at the multiplier pin MULT. The third capacitor C3 is of a value (for example, ~1 µF) in order to be always charged in one direction through the diode D1 up to a voltage $V_p$, which is proportional to the peak voltage detected from the rectified line voltage $V_{line}$. The MOSFET Q4 turns on or off, according to the value of the voltage $V_p$. When operating with no dimmer at a first voltage (e.g., 120V), the voltage $V_p$ will be proportional to a first peak value (e.g., 170V). When operating with no dimmer at a second voltage (e.g., 277V), the voltage $V_p$ will be proportional to a second peak value (e.g., 392V). In consequence, resistance ratios R7/(R6+R7) and R5/(R4+R5) are selected in such a way that at the first voltage (e.g., 120V), the MOSFET Q4 is continuously open, and at the second voltage (e.v., 277V), the MOSFET Q4 is continuously closed.

In addition, the resistance ratios R7/(R6+R7) and R5/(R4+R5) have to meet another important condition. When a phase-cut dimmer/phase cut dimming circuitry is connected to the circuit 130, for any possible input voltage, along any position of the dimmer, and using either trailing-edge or leading-edge mechanism, the gate voltage at the MOSFET Q4 should be in such a way that the MOSFET Q4 will unambiguously either continuously open during dimming at the first voltage or continuously close during dimming at the second voltage. This unambiguousness of the voltage $V_p$ should occur even at the minimum position of the dimmer, which usually is not less than 30° in commercially available cut-phase dimmers.

Figure 14:
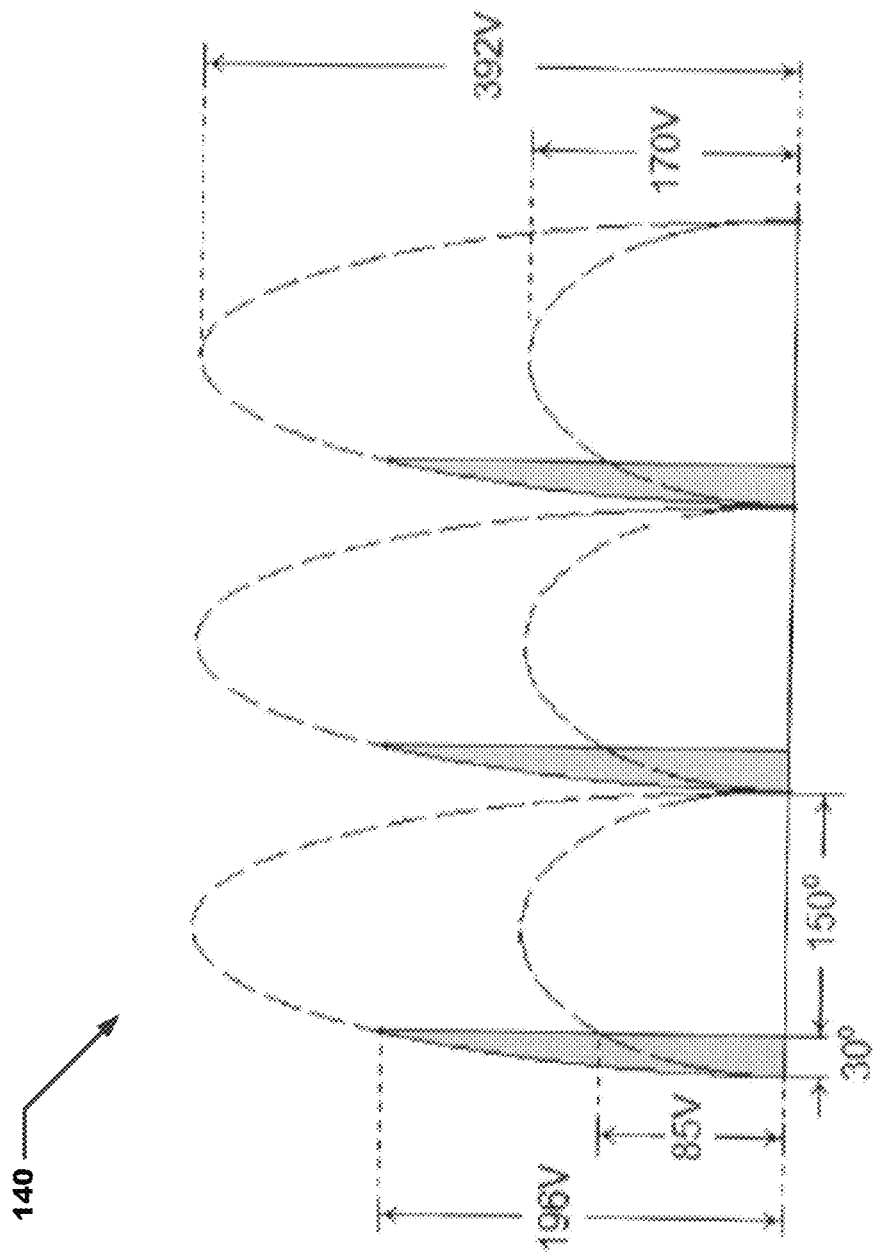
FIG. 14 depicts a graph showing a dimmer at minimum light in a trailing edge mode according to embodiments disclosed herein.
Figure 15:
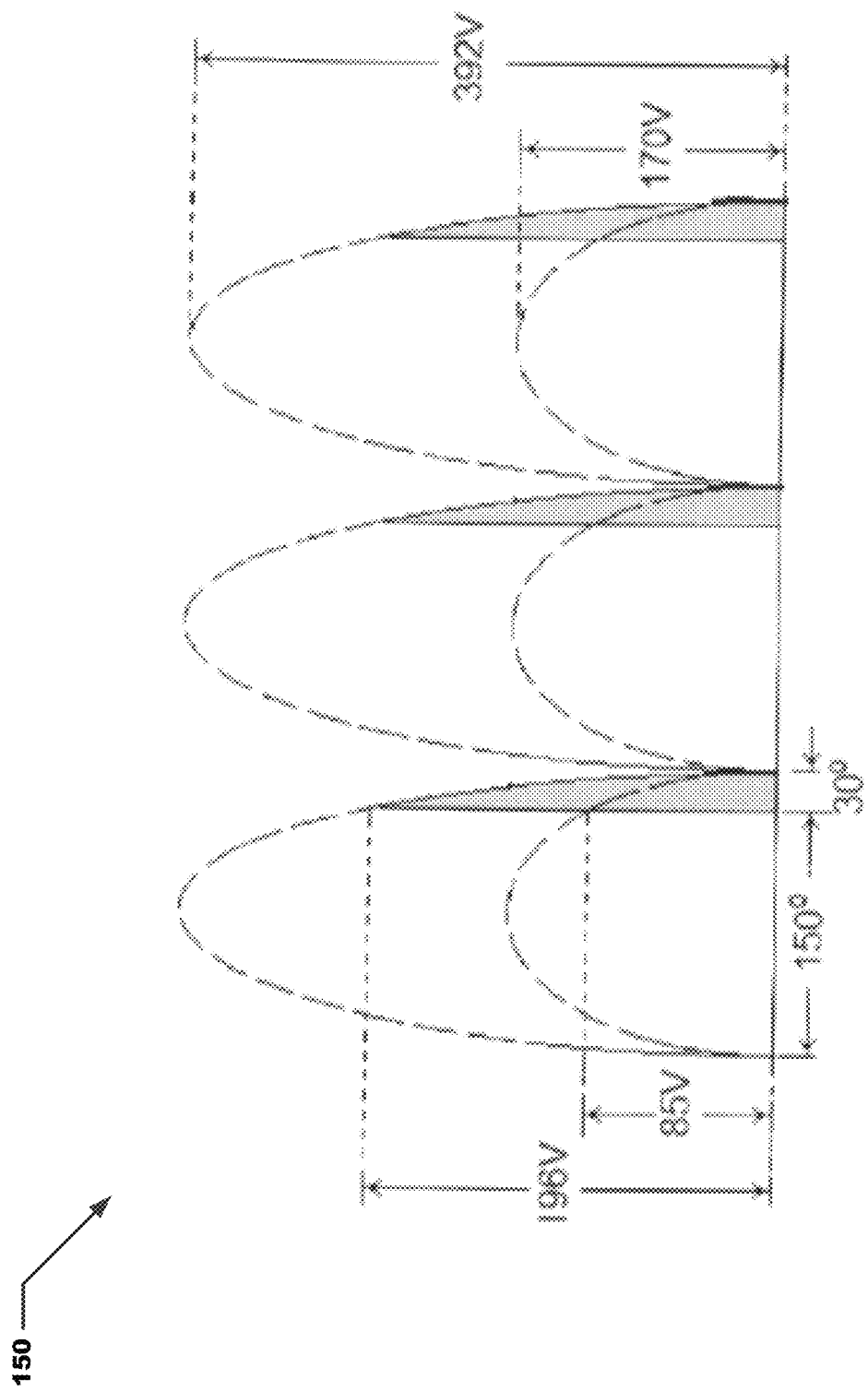
FIG. 15 depicts a graph showing a dimmer at minimum light in a leading edge mode according to embodiments disclosed herein.

FIGS. 14 and 15 show graphs 140, 150 of the state of switches over the range of dimming. The graphs 140, 150 show that, for both leading-edge (the graph 140) and trailing-edge (the graph 150) operation, the detectable peak value for the first voltage (e.g., 120V) goes from a first value (e.g., 85V) up to a second value (e.g., 170V), and for the second voltage (e.g., 277V), the detectable peak goes from a third value (e.g., 196V) up to a fourth value (e.g., 392V). This means that the lowest detectable peak at dimming at the second voltage will always be higher than the second value. Therefore, selecting the resistance ratios as, for example, R7/(R6+R7)=0.03 and R~(R4+R5)=0.96, assures an unmistaken operation during any phase cut dimming. Thus, embodiments such as shown in FIG. 13 provide a simple, low-cost configuration to enable the driver to perform reliable operation during dimming at multiple input voltages, such as but not limited to both 120V and 277V.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:
1. A circuit comprising:
an anchoring circuit in communication with a dimming controller circuit, the anchoring circuit comprising a proportional direct current (DC) voltage input, a biasing voltage input, a connection to a ground reference, and an output in communication with the dimming controller circuit;
wherein the anchoring circuit provides a reference voltage to permit phase cut dimming to be operable at a plurality of line voltages, and wherein the anchoring circuit comprises:
a first resistor comprising a first lead coupled to a positive proportional DC voltage and comprising a second lead;
a second resistor comprising a first lead coupled to a biasing voltage and comprising a second lead;

a third resistor comprising a first lead coupled to the biasing voltage and comprising a second lead;
a fourth resistor comprising a first lead coupled to the second lead of the second resistor and comprising a second lead;
a fifth resistor comprising a first lead coupled to a second lead of the third resistor and comprising a second lead;
a first transistor comprising a first lead coupled to the second lead of the second resistor, a second lead coupled to the second lead of the first resistor, and a third lead coupled to the ground reference;
a second transistor comprising a first lead coupled to the second lead of the fourth resistor, a second lead coupled to the second lead of the third resistor, and a third lead coupled to the ground reference; and
a third transistor comprising a first lead coupled to the second lead of the fifth resistor, a second lead comprising an output of the anchoring circuit, and a third lead coupled to the ground reference.

2. The circuit of claim 1, wherein the first transistor comprises a silicon controlled rectifier (SCR) and wherein the first lead of the SCR comprises an anode, the second lead comprises a gate, and the third lead comprises a cathode.

3. The circuit of claim 1, wherein the second transistor comprises an NPN transistor and wherein the first lead of the NPN transistor comprises a base of the NPN transistor, the second lead comprises an emitter of the NPN transistor, and the third lead comprises a collector of the NPN transistor.

4. The circuit of claim 1, wherein the third transistor comprises a MOSFET and wherein the first lead of the MOSFET comprises a gate of the MOSFET, the second lead comprises a drain of the MOSFET, and the third lead comprises a source of the MOSFET.

5. The circuit of claim 1, wherein for a first input voltage the third transistor is open, the second transistor is closed, and the first transistor is open.

6. The circuit of claim 1, wherein for a second input voltage the third transistor is closed, the second transistor is open, and the first transistor is closed.

7. A phase cut dimming circuit comprising:
a dimming controller circuit, the dimming controller circuit comprising an input receiving a line voltage, a connection to a ground, and an output;
an anchoring circuit in communication with the dimming controller circuit, the anchoring circuit comprising an input, a connection to a ground, and an output in communication with the dimming controller circuit;
wherein the anchoring circuit provides a reference voltage to permit phase cut dimming to be operable at a plurality of line voltages, and wherein the anchoring circuit comprises:
a first resistor comprising a first lead coupled to a positive proportional DC voltage and comprising a second lead;
a second resistor comprising a first lead coupled to a biasing voltage and comprising a second lead;
a third resistor comprising a first lead coupled to the biasing voltage and comprising a second lead;
a fourth resistor comprising a first lead coupled to the second lead of the second resistor and comprising a second lead;
a fifth resistor comprising a first lead coupled to a second lead of the third resistor and comprising a second lead;
a first transistor comprising a first lead coupled to the second lead of the second resistor, a second lead coupled to the second lead of the first resistor, and a third lead coupled to the ground reference;
a second transistor comprising a first lead coupled to the second lead of the fourth resistor, a second lead coupled to the second lead of the third resistor, and a third lead coupled to the ground reference; and
a third transistor comprising a first lead coupled to the second lead of the fifth resistor, a second lead comprising an output of the anchoring circuit, and a third lead coupled to the ground reference.

8. The phase cut dimming circuit of claim 7, wherein the dimming controller circuit comprises:
a controller comprising an input coupled to a center point of a voltage divider circuit, the controller providing an output to couple to a primary side regulated analog flyback converter; and
wherein the voltage divider circuit is coupled between the line voltage and the ground, and wherein the voltage divider circuit comprises:
a first resistor comprising a first lead coupled to the input of the controller and a second lead coupled to the ground;
a second resistor comprising a first lead coupled to the input of the controller and a second lead coupled to the line voltage, and wherein the first lead of the second resistor and the first lead of the first resistor comprise the center point of the voltage divider circuit; and
a third resistor comprising a first lead coupled to the center point of the voltage divider circuit and a second lead to couple to an input of the anchoring circuit.

9. The phase cut dimming circuit of claim 7, wherein the first transistor comprises a silicon controlled rectifier (SCR) and wherein the first lead of the SCR comprises an anode, the second lead comprises a gate, and the third lead comprises a cathode.

10. The phase cut dimming circuit of claim 7, wherein the second transistor comprises an NPN transistor and wherein the first lead of the NPN transistor comprises a base of the NPN transistor, the second lead comprises an emitter of the NPN transistor, and the third lead comprises a collector of the NPN transistor.

11. The phase cut dimming circuit of claim 7, wherein the third transistor comprises a MOSFET and wherein the first lead of the MOSFET comprises a gate of the MOSFET, the second lead comprises a drain of the MOSFET, and the third lead comprises a source of the MOSFET.

12. The phase cut dimming circuit of claim 7, wherein for a first input voltage, the third transistor is open, the second transistor is closed, and the first transistor is open.

13. The phase cut dimming circuit of claim 7, wherein for a second input voltage, the third transistor is closed, the second transistor is open, and the first transistor is closed.

14. A phase cut dimming circuit comprising:
a dimming controller circuit, the dimming controller circuit comprising an input receiving a line voltage, a connection to a ground, and an output;
an anchoring circuit in communication with the dimming controller circuit, the anchoring circuit comprising an input, a connection to a ground, and an output in communication with the dimming controller circuit;
wherein the anchoring circuit provides a reference voltage to permit phase cut dimming to be operable at a plurality of line voltages; and wherein the dimming controller circuit comprises:
  a controller comprising an input coupled to a center point of a voltage divider circuit, the controller providing an output to couple to a primary side regulated analog flyback converter; and
  wherein the voltage divider circuit is coupled between the line voltage and the ground, and wherein the voltage divider circuit comprises:
    a first resistor comprising a first lead coupled to the input of the controller and a second lead coupled to the ground;
    a second resistor comprising a first lead coupled to the input of the controller and a second lead coupled to the line voltage, and wherein the first lead of the second resistor and the first lead of the first resistor comprise the center point of the voltage divider circuit; and
    a third resistor comprising a first lead coupled to the center point of the voltage divider circuit and a second lead to couple to an input of the anchoring circuit.

* * * * *